United States Patent

Ueda

Patent Number: 5,249,513
Date of Patent: Oct. 5, 1993

[54] APPARATUS FOR PRODUCING FINE-TEXTURED SOYBEAN CURD AS PLACED IN CONTAINERS

[75] Inventor: Michio Ueda, Tokushima, Japan

[73] Assignee: Shikoku Kakoki Co., Ltd., Tokushima, Japan

[21] Appl. No.: 975,338

[22] Filed: Nov. 16, 1992

[30] Foreign Application Priority Data

Nov. 18, 1991 [JP] Japan .................................. 3-302117

[51] Int. Cl.⁵ ............................ A23C 3/02; A23J 1/00; A23L 1/20
[52] U.S. Cl. ............................. 99/453; 99/459; 99/465; 99/483; 99/496
[58] Field of Search ........................ 99/353-356, 99/452, 453, 458-460, 465, 467, 473, 474, 477-479, 483, 495, 496, 509, 510; 100/115, 116, 118, 125; 249/113; 425/84, 405 R

[56] References Cited

U.S. PATENT DOCUMENTS

| | | | |
|---|---|---|---|
| 1,405,016 | 1/1922 | Senke | 99/465 |
| 2,260,286 | 10/1941 | Allan | 99/478 |
| 2,846,767 | 8/1958 | Hengen et al. | 99/458 |
| 3,838,955 | 10/1974 | Dubbeld | 425/84 |
| 4,049,838 | 9/1977 | Krueger et al. | 99/458 |
| 4,509,413 | 4/1985 | Granberg et al. | 99/453 |
| 4,608,921 | 9/1986 | Mongiello, Sr. | 99/455 |
| 4,628,805 | 12/1986 | Derode | 99/460 |
| 4,750,415 | 6/1988 | Ostemar | 99/456 |
| 4,771,681 | 9/1988 | Nagata | 99/483 |
| 4,817,515 | 4/1989 | Bjerre et al. | 99/460 |

*Primary Examiner*—Timothy F. Simone
*Attorney, Agent, or Firm*—Armstrong, Westerman, Hattori, McLeland & Naughton

[57] ABSTRACT

An apparatus for producing fine-textured soybean curd as placed in containers comprises means for filling a mixture of soybean milk and a coagulant into coagulating buckets, means for heating the mixture to coagulate the mixture into soybean curd, covering means for placing an inverted container over each of the buckets to cover an upper-end opening of the bucket without dewatering the soybean curd within the bucket, means for inverting the bucket and the container as placed over the bucket, and means for withdrawing the soybean curd as accommodated in the container from the bucket by moving down the inverted container.

7 Claims, 2 Drawing Sheets

5,249,513

APPARATUS FOR PRODUCING FINE-TEXTURED SOYBEAN CURD AS PLACED IN CONTAINERS

BACKGROUND OF THE INVENTION

The present invention relates to an apparatus for producing soybean curd, and more particularly to an apparatus for producing in large quantities fine-textured soybean curd ("kinugoshi tofu") as placed in containers, i.e., soybean curd which is obtained by coagulating a mixture of soybean milk and a coagulant as placed in containers without dewatering and molding.

As disclosed, for example, in Unexamined Japanese Patent Publication No. 94648/1991, apparatus of the type mentioned are already known which comprise means for filling a mixture of soybean milk and a coagulant into coagulating buckets, means for heating the mixture to coagulate the mixture into soybean curd, means for placing a receiving member on the curd in each of the buckets without dewatering the curd, bucket inverting means for inverting the bucket and the receiving member as placed on the soybean curd, means for withdrawing the soybean curd as supported on the receiving member from the bucket by moving down the inverted receiving member, covering means for placing an inverted container over the soybean curd on the receiving member, and means for inverting the inverted container.

When withdrawn as supported on the receiving member from the bucket, the fine-textured soybean curd, which is very soft, liable to deform and fragile unlike harder or coarse-textured soybean curd ("momen tofu"), readily deforms. If the container is placed over the deformed curd, the container is likely to cut off part of the curd, which becomes a faulty product. The ratio of occurrence of such rejects is usually 7 to 10% and is by no means low.

SUMMARY OF THE INVENTION

An object of the present invention is to provide an apparatus for efficiently producing fine-textured soybean curd or kinugoshi tofu as placed in containers with occurrence of rejects prevented.

The apparatus of the present invention for producing fine-textured soybean curd as placed in containers comprises means for filling a mixture of soybean milk and a coagulant into coagulating buckets, means for heating the mixture to coagulate the mixture into soybean curd, covering means for placing an inverted container over each of the buckets to cover an upper-end opening of the bucket without dewatering the soybean curd within the bucket, means for inverting the bucket and the container as placed over the bucket, and means for withdrawing the soybean curd as accommodated in the container from the bucket by moving down the inverted container.

With the soybean curd producing apparatus described, the soybean curd coagulated within the bucket is transferred directly to the container without being withdrawn from the bucket. This eliminates the likelihood that the curd will be partly cut off by the container during transfer from the bucket to the container, precluding occurrence of rejects.

DESCRIPTION OF THE PREFERRED EMBODIMENT

An embodiment of the invention will be described below with reference to the drawings. In the following description, the terms "front" and "rear" are used with reference to FIG. 1; the right-hand side of FIG. 1 will be referred to as "front," and the opposite side thereof as "rear." The terms "right" and "left" will be used for the apparatus as it is seen toward the front.

Figure 1:
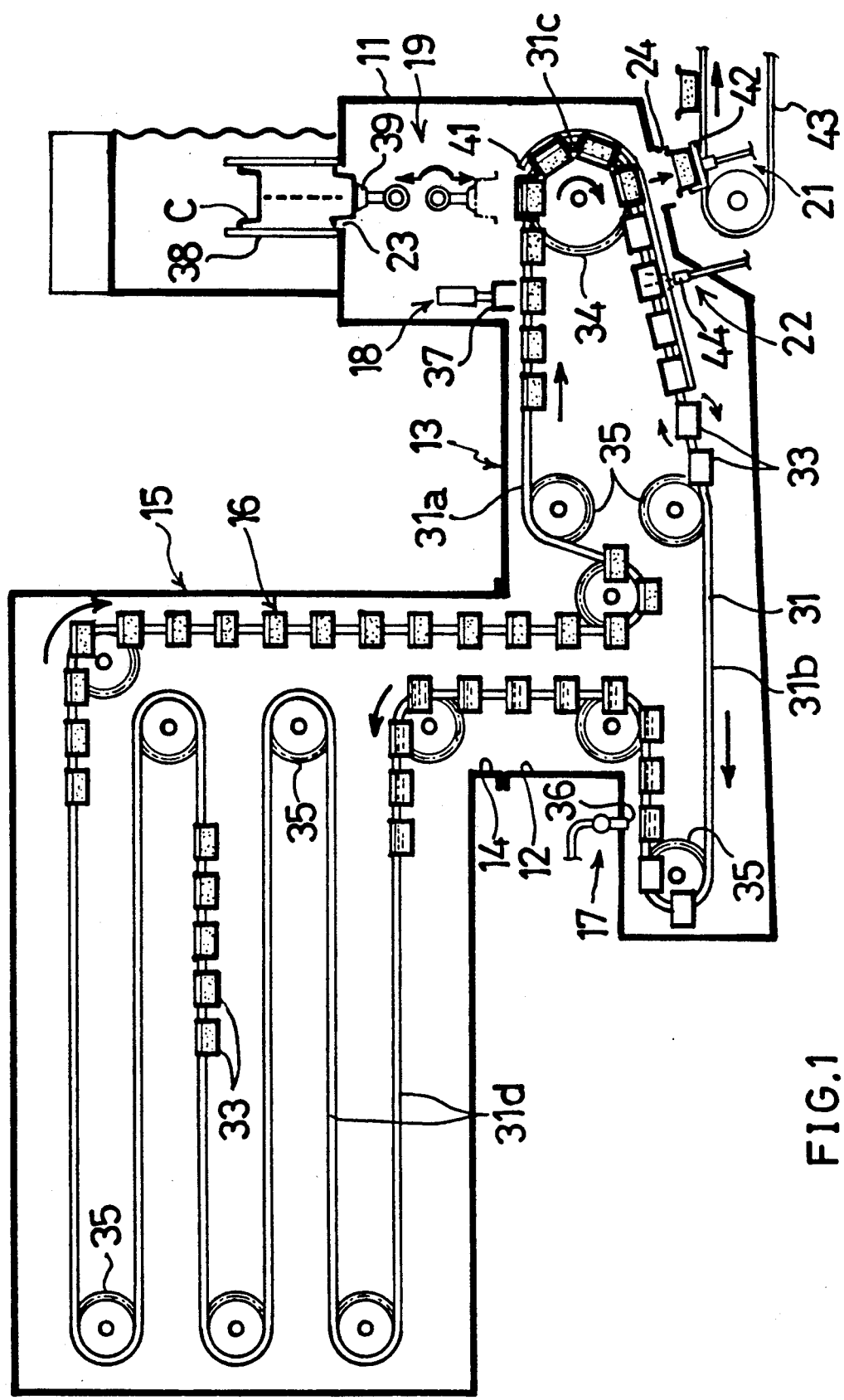
FIG. 1 is a longitudinal view in vertical section showing the construction of an apparatus embodying the invention.

FIG. 1 shows an apparatus for producing fine-textured soybean curd or "kinugoshi tofu," which comprises a lower chamber 13 having an upward extension chamber 11 formed at the front end of its top and having an upward communication opening 12 formed in a top wall portion close to its rear end, an upper chamber 15 having a downward communication opening 14 formed in its bottom wall and communicating with the opening 12, and a bucket conveyor 16 provided in both the lower chamber 13 and the upper chamber 15 and extending through the two openings 12, 14.

The lower and upper chambers 13, 15 are each closed. Aseptic air is supplied to the lower chamber 13 to maintain the interior thereof at a positive pressure. Steam is supplied to the upper chamber 15 to maintain the interior thereof at a high temperature of about 95° C. The extension chamber 11 has a top wall formed with a container inlet 23. The lower chamber 13 has a bottom wall formed with a container outlet 24 in a front end portion thereof.

The bucket conveyor 16 comprises a pair of right and left endless chains 31 movable in circulation within the lower and upper chambers 13, 15, a multiplicity of slats 32 connected between the chains 31 and arranged at a predetermined spacing, and a plurality of buckets 33 attached to each of the slats 32 (see FIG. 2).

Each of the chains 31 is reeved around an intermittently driving sprocket 34 disposed in an interior front portion of the lower chamber 13 and a plurality of driven sprockets 35 arranged at required portions inside the two chambers 13, 15. The buckets 33 are movable along an upper path 31a extending generally forward within the lower chamber 13, a lower path 31b extending rearward below the upper path 31a, an inverting path 31c interconnecting the front ends of the upper path 31a and the lower path 31b, and a zigzag path 31d deflected upward from an intermediate portion of the upper path 31a to extend into the upper chamber 15, further extending upward while zigzagging forward and rearward within the upper chamber 15, and then directed downward to join the upper path 31a.

Each of the slats 32 is pivotably connected at each of its opposite ends to the chain 31 by an unillustrated horizontal pin, whereby the buckets 33 thereon are so positioned in a spontaneous state that their openings are directed upward at all times. Each bucket 33 has a capacity to accommodate an amount of soybean curd corresponding to a piece of soybean curd of specified size (about 400 c.c. on the average) with an allowance, and is made of a plastics so as to be inexpensive to make.

If heat conductivity and durability are more important than the cost, the bucket may be made of stainless steel.

A top wall rear portion of the lower chamber 13 is provided with a filling device 17. The filling device 17 has filling nozzles 36 positioned at the rear end of the upper path 31a of movement of the chains and extending through the top wall rear portion of the lower chamber 13. Disposed inside the extension chamber 11 is a covering device 19 positioned at the front end of the upper path 31a of movement of the chains. The covering device 19 comprises magazines 38 arranged along the edge of the container inlet 23 and each accommodating a multiplicity of containers C as oriented upward and stacked up, and vacuum cups 39 each arranged between the magazine 38 and the path of movement of the conveyor immediately therebelow, movable upward and downward and invertible through 180 degrees. A separating device 18 is disposed to the rear of the covering device 19 at a short distance therefrom. The separating device 18 has separating members 37 each movable vertically into or out of the bucket 33. The separating member 37 is in the form of a tube shaped generally in conformity with the inner periphery of the bucket 33. A widthdrawing device 21 is disposed at the front end of the lower path 31b of movement of the chains. A washing device 22 is disposed slightly to the rear of the device 21 and has wash liquor jet nozzles 44 oriented upward toward the path 31b from therebelow. The wash liquor is, for example, aseptic water. Container inverting guide rails 41 are arranged along the inverting path 31c of the chains and the lower path 31b to extend to the position of the washing device 22. The withdrawing device 21 has container receivers 42 L-shaped in cross section and movable upward and downward through the container outlet 24. A container discharge converyor 43 extends forward from a position immediately adjacent to the container receivers 42 as located at the lower limit position of their upward and downward movement.

Figure 2A:
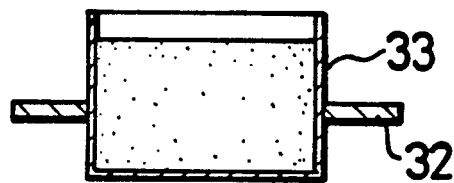
FIGS. 2a-2d are diagrams illustrating the operation of the apparatus.
Figure 2B:
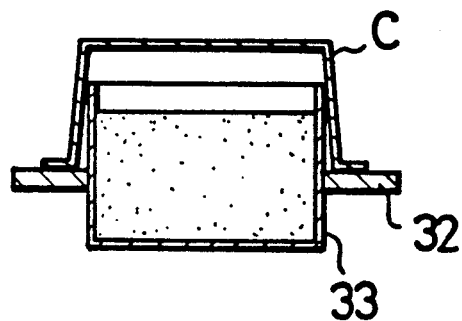

When each bucket 33 is brought to below the filling nozzle 36, the nozzle 36 fills a mixture of soybean milk and coagulant in an amount corresponding to one piece of soybean curd as stated previously into the bucket 33 (see FIG. 2a). The coagulant is magnesium chloride (bittern). The mixture is prepared from soybean milk and the coagulant which are cooled to below than the coagulating temperature by mixing together these ingredients immediately before filling.

Instead of quick-acting coagulants typical of which is magnesium chloride, slow-acting coagulants, such as calcium sulfate, may be used. In this case, the soybean milk as heated to not lower than the coagulating temperature and the coagulant are individually filled into the bucket with stirring, and aseptic air having ordinary temperature is supplied to the upper chamber instead of the supply of steam.

The buckets 33 filled with the mixture move upward out of the lower chamber 13 into the upper chamber 15, travel zigzag within the upper chamber 15 and finally move downward to enter the lower chamber 13 again. In the meantime, the buckets 33 remain directed upward. The time taken for the buckets 33 to pass through the upper chamber 15 is about 30 minutes, and during this period, the mixture within the buckets 33 coagulates into soybean curd.

When each bucket 33 having the soybean curd accommodated therein is brought to below the separating member 33, the separating member 33 lowers into the bucket 33 while moving along the inner peripheral surface of the bucket 33, whereby the periphery of the curd within the bucket 33 is separated from the bucket 33. When the bucket 33 is subsequently brought to below the covering device 19, the vacuum cup 39 attracts thereto from the magazine 38 a container C with its opening up, turns upside down while lowering and places the container C as inverted thereby over the bucket 33 (see FIG. 2b)

Figure 2C:
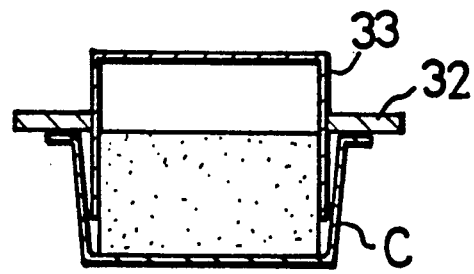
Figure 2D:
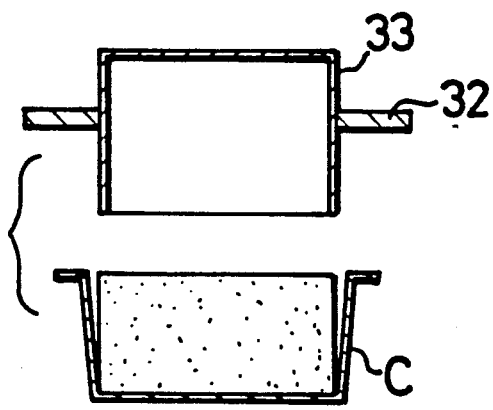

While the bucket 33 so far remains directed upward, the bucket 33 is thereafter restrained from pivotally moving by itself by the guide rail 41 while moving from the front end of the upper path 31a to an intermediate portion of the lower path 31b. In the meantime, the bucket 33 as covered with the container C is directed downward, allowing the soybean curd to move inside the bucket 33 and to be supported by the bottom of the container C (FIG. 2c). The container C receiving the soybean curd along with the bucket 33 then reaches a position above the container outlet 24, whereupon the container receiver 42 receives the bottom of the container C and lowers, whereby the container C is moved away from the bucket 33 for the transfer of the curd to the container C (FIG. 2d). The container C accommodating the soybean curd is delivered from the lower chamber 13 onto the container discharge conveyor 43 through the container outelt 24.

The bucket 33 separated from the container C is washed with a wash liquor forced out from the nozzle 44 and is thereafter released from the guide rail 41, whereupon the bucket 33 turns by itself to an upwardly directed position again. The bucket 33 thereafter reaches the position below the filling nozzle 36, whereby one cycle of production operation is completed.

What is claimed is:

1. An apparatus for producing fine-textured soybean curd as placed in containers, the apparatus comprising:
   means for filling a mixture of soybean milk and a coagulant into coagulating buckets,
   means for heating the mixture to coagulate the mixture into soybean curd,
   covering means for placing an inverted container over each of the buckets to cover an upper-end opening of the bucket without dewatering the soybean curd within the bucket,
   means for inverting the bucket and the container as placed over the bucket, and
   means for withdrawing the soybean curd as accommodated in the container from the bucket by moving down the inverted container.

2. An apparatus as defined in claim 1 wherein the container is designed for commercial use along with the soybean curd, and the bucket has a capacity corresponding to the amount of soybean curd to be placed into the single container.

3. An apparatus as defined in claim 2 wherein the amount of soybean curd to be placed into the single container is about 400 c.c.

4. An apparatus as defined in claim 1 wherein the inverting means has endless chains carrying the buckets attached thereto, and the chains have an upper path of movement, a lower path of movement and an inverting path interconnecting the terminal end of the upper path and the starting end of the lower path.

5. An apparatus for producing fine-textured soybean curd as placed in containers, the apparatus comprising:

a lower chamber having an aseptic atmosphere therein, an upper chamber communicating with the lower chamber and having a hot atmosphere held therein for coagulating a mixture of soybean milk and a coagulant, a conveyor provided both in the lower chamber and in the upper chamber and having endless chains and a multiplicity of coagulating buckets attached to the chains, each of the coagulating buckets having an opening directed upward by gravity, the coagulating buckets being movable along an upper path extending generally horizontally inside the lower chamber, a lower path extending in an approximately opposite direction to the upper path, an inverting path interconnecting the terminal end of the upper path and the starting end of the lower path, and a zigzag path deflected upward from an intermediate portion of the upper path, extending upward while zigzagging horizontally inside the upper chamber, and thereafter directed downward to join the upper path, means for filling the mixture of soybean milk and coagulant into the buckets at the starting end of the upper path, covering means for placing an inverted container over each of the buckets at the terminal end of the upper path to cover the opening of the bucket, a guide disposed along the inverting path for inverting the bucket and the container as placed thereover without allowing the bucket to turn by itself along with the container, and means for withdrawing soybean curd as accommodated in the container from the bucket by moving down the inverted container at the starting end of the lower path.

6. An apparatus as defined in claim 5 wherein the upper path is provided upstream from the filling means with means for separating soybean curd from the buckets.

7. An apparatus as defined in claim 5 wherein the lower path is provided downstream from the withdrawing means with means for washing the buckets.

* * * * *